(12) United States Patent
Cheshire

(10) Patent No.: US 7,930,289 B2
(45) Date of Patent: Apr. 19, 2011

(54) METHODS AND SYSTEMS FOR PROVIDING IMPROVED SECURITY WHEN USING A UNIFORM RESOURCE LOCATOR (URL) OR OTHER ADDRESS OR IDENTIFIER

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/497,399

(22) Filed: Jul. 31, 2006

(65) Prior Publication Data

US 2007/0112774 A1 May 17, 2007

Related U.S. Application Data

(63) Continuation of application No. 11/273,379, filed on Nov. 12, 2005.

(51) Int. Cl.
*G06F 17/30* (2006.01)
*G06F 7/00* (2006.01)
(52) U.S. Cl. .......................................... 707/709; 707/783
(58) Field of Classification Search .................. 707/10, 707/101, 709, 783
See application file for complete search history.

(56) References Cited

U.S. PATENT DOCUMENTS

| 6,360,254 | B1 | 3/2002 | Linden et al. | |
|---|---|---|---|---|
| 7,114,177 | B2 * | 9/2006 | Rosenberg et al. | 726/4 |
| 2005/0097179 | A1 | 5/2005 | Orme | |
| 2005/0188171 | A1 | 8/2005 | McIntosh | |
| 2006/0015722 | A1 * | 1/2006 | Rowan et al. | 713/166 |
| 2006/0095404 | A1 * | 5/2006 | Adelman et al. | 707/3 |
| 2006/0168056 | A1 | 7/2006 | Gandhi et al. | |
| 2006/0230039 | A1 * | 10/2006 | Shull et al. | 707/6 |
| 2006/0265747 | A1 | 11/2006 | Judge | |
| 2007/0028110 | A1 | 2/2007 | Brennan | |

* cited by examiner

*Primary Examiner* — Kuen S Lu
(74) *Attorney, Agent, or Firm* — Blakely, Sokoloff, Taylor & Zafman LLP

(57) ABSTRACT

Methods and systems for improving security when accessing a URL, such as a Web site. In one exemplary method, a user is warned if a previously unvisited Web site being accessed originated from an email message or other electronic source external to a Web browser being used to access the Web site. Other methods, as well as data processing systems and machine-readable media, are also described.

16 Claims, 15 Drawing Sheets

METHODS AND SYSTEMS FOR PROVIDING IMPROVED SECURITY WHEN USING A UNIFORM RESOURCE LOCATOR (URL) OR OTHER ADDRESS OR IDENTIFIER

This application is a continuation application of co-pending U.S. patent application Ser. No. 11/273,379, filed Nov. 12, 2005.

FIELD OF THE INVENTIONS

Certain aspects of the present inventions generally relate to methods to access and interact with Web presentations that are initiated from an email message or other electronic document. The present inventions also relate to methods to improve user security when accessing Web presentations.

BACKGROUND OF THE INVENTIONS

The widespread use of the Internet as an electronic communication medium has made the use of electronic mail, otherwise known as email, very common among users of data processing systems, including general purpose computer systems, cellular telephones, personal digital assistants (PDAs), Internet appliances, and other types of data processing systems. While email provides for the rapid exchange of text and other information through a network, it does present certain problems to users. One such problem is referred to as phishing or an email spoofing scam. A spoofing scam has the potential to inflict serious losses of data and direct monetary losses due to fraud and other schemes, and the spoofing scam may be part of an attempt at identity theft. A classic example of a spoofing scam is the creation of email messages that appear to be emails sent from legitimate sources, such as a bank. A spoofing scam will typically attempt to fool a user into submitting personal, financial, or password data to the originator of the scam, allowing them to use such data for currency transfers and other fraudulent and potentially criminal schemes. Typically, a spoofing scam involves an email which arrives with the spoofed company's logo and email layout. These spoofed emails may direct the user through a link in the email to a spoofed Web page which is a fake representation of a legitimate Web page, such as a Web page of amazon.com or a bank's Web page, and the spoofed Web page asks the user to enter personal, financial or password data or other types of data sought by the organizers of the scam. The organizers of these types of scams use sophisticated techniques to make it difficult to determine the originator of the email. They often will make the email appear as if it came from a legitimate source, such as amazon.com or a bank's Web site, or a bank. By faking the identity of a legitimate source, the scammers are attempting to fool users into believing that the email is authentic and actually from the legitimate owner, such as amazon.com or a bank or other organizations which are well known to users. By adding a link (e.g. a URL), in the seemingly authentic email, to a fake Web site, it is easy for a user to select the link (e.g. by "clicking" on the link in the email) which causes a Web browser to open a window and to display the fake Web site. It is relatively easy to copy an authentic Web site (e.g. copy the HTML code and graphics and text of the Web page or pages), so the user may be easily tricked into giving their personal, financial, etc. data to the scammer.

In response to these scams, a working group known as the anti-phishing working group has been established; this working group now has a Web site at www.antiphishing.com. This working group has identified certain solutions to address the threat of spoofing scams. One of these solutions involves the use of digitally signed email. However, such solutions will often require users, such as users at a home, to have a relatively high level of sophistication necessary to install the authentication data and to maintain the authentication data.

Thus it is desirable to provide a simple solution to guard against email spoofing.

SUMMARY OF THE DESCRIPTION

At least certain embodiments of the inventions protect a user from phishing or email spoofing attempts by automatically generating a list of trusted locations or addresses or identifiers and examining an electronic location or address or identifier and determining whether the electronic location or address or identifier is on the list of trusted locations or addresses and determining whether to warn the user. The list is created automatically, in at least certain embodiments, over time by user actions on a system which maintains the list and which determines whether to warn the user if the electronic location or address is not on the list. If the electronic location or address is on the list, this normally means the user has previously visited this location or address (e.g. a Web page) in a manner considered safe by the system. For example, if the user types by hand an identifier or address, then the system regards the identifier or address as safe and adds it automatically to the list, and if the user selects a link on a Web page which has been accepted as safe, then the target of that link is also automatically added to the list. Thus, in a typical case, the list is populated automatically by the system without requiring explicit and burdensome decision-making by the user. By automatically populating the list with URLs the user types and URLs the user selects on already-trusted pages, the list automatically becomes populated in such a way that a typical user should never see a warning except when seeing an actual phishing site. Thus, embodiments of the invention may operate unobtrusively (as if in the background) and require no input from the user until there is a real problem (e.g. a real phishing site).

According to one aspect of the present inventions, an exemplary method of processing a URL (Uniform Resource Locator) includes: receiving an input from a user to access a Web site through a URL included in an electronic message or document, such as an email; verifying if the Web site has been deemed to be trusted (e.g. accessed through a trusted source for the URL, such as typing the URL) before by at least one of the user or the system being used by the user; and presenting a warning to the user if the Web site is not deemed to be trusted. The input from the user may involve selecting the URL (e.g. by "clicking" on the URL) in the electronic message or document. The system may verify whether the Web site has been deemed to be trusted by comparing a host name within the URL to a list of host names in a history list of Web sites which have been indicated to be trusted. This history list may, in certain exemplary embodiments, initially be "seeded" by the manufacturer of the data processing system with a list of known, trusted host names (e.g. apple.com; ebay.com; amazon.com; google.com) or may be additionally or alternatively "seeded" by the user's importing of bookmarks or favorites from previously used Web browsers or systems into a new Web browser or data processing system, and the user builds, in certain exemplary embodiments, on this history list every time they type a URL by hand or follow a link from a trusted page, or, more rarely, by indicating explicitly that a Web site is to be trusted when prompted by the data processing system for a decision about whether to trust the Web site. The host name may be parsed from a URL by following the conventions defined for URLs, such as the conventions defined in RFC 1738 (see, e.g. www.ietf.org/rfc/rfc1738.txt). When the user indicates that the Web site is to be trusted, then the host name in the URL for that Web site is added to the history list. In at least certain embodiments, the user may be prompted by the data processing system for such a decision only when the URL is entered in a Web browser in certain ways, such as when the URL is passed to a Web browser by an email application program which has displayed an email with the URL in the email.

According to another aspect of the present inventions, an exemplary method of processing a URL includes: determining a source of a selected URL, wherein the determining results in classifying the source as one of a first class (e.g. a trusted source) or a second class and wherein the selected URL includes a first portion, such as a host name within the URL; determining, in response to determining that the source is classified in the second class (e.g. an untrusted source), whether the data processing system has previously accepted as trusted another URL which includes the same first portion; and if not then presenting a warning. In one implementation, the source is classified (e.g. determined) to be in the second class if it is from an email or an electronic document such as a PDF or word processing file, and the source is determined to be in the first class if it is from a user's typing of a URL into a text field of a Web browser or by following a link on an already-trusted page. In this implementation, a representation (e.g. a host name portion) of URLs classified in the first class will be automatically added to the history list of the trusted URLs, and consequently the display of information obtained through these URLs will not include a presentation (e.g. display) of a warning. Other methods, systems, and machine-readable medium which provide executable instructions are also described below.

BRIEF DESCRIPTION OF THE DRAWINGS

The following invention is described by way of example and not limitation on the figures of the accompanying drawings in which like references indicate similar elements.

DETAILED DESCRIPTION

The subject of the inventions will be described with reference to numerous details and accompanying drawings set forth herein. The following description and drawings are illustrative of the inventions and are not to be construed as limiting the inventions. Numerous specific details are described to provide a thorough understanding of the present inventions. However, in certain instances, well known or conventional details are not described in order to not unnecessarily obscure the present inventions. It will be apparent to one skilled in the art that the present inventions may be practiced without these specific details.

At least certain embodiments of the inventions protect a user from phishing or email spoofing attempts by automatically generating a list of trusted locations or addresses or identifiers and examining an electronic location or address or identifier and determining whether the electronic location or address or identifier is on the list of trusted locations or addresses and determining whether to warn the user. The list is created automatically, in at least certain embodiments, over time by user actions on a system which maintains the list and which determines whether to warn the user if the electronic location or address is not on the list. If the electronic location or address is on the list, this normally means the user has previously visited this location or address (e.g. a Web page) in a manner considered safe by the system. For example, if the user types by hand an address, then the system regards the address as safe and adds it automatically to the list, and if the user selects a link on a Web page which has been accepted as safe, then the address of that link is also automatically added to the list. Thus, in a typical case, the list is populated automatically by the system without requiring explicit and burdensome decision-making by the user. By automatically populating the list with URLs the user types and URLs the user selects on already-trusted pages, the list automatically becomes populated in such a way that a typical user should never see a warning except when seeing an actual phishing site. Thus, embodiments of the invention may operate unobtrusively (as if in the background) and require no input from the user until there is a real problem (e.g. a real phishing site). Before describing embodiments of the inventions further, certain background information about networks and data processing systems will be provided.

Figure 1:
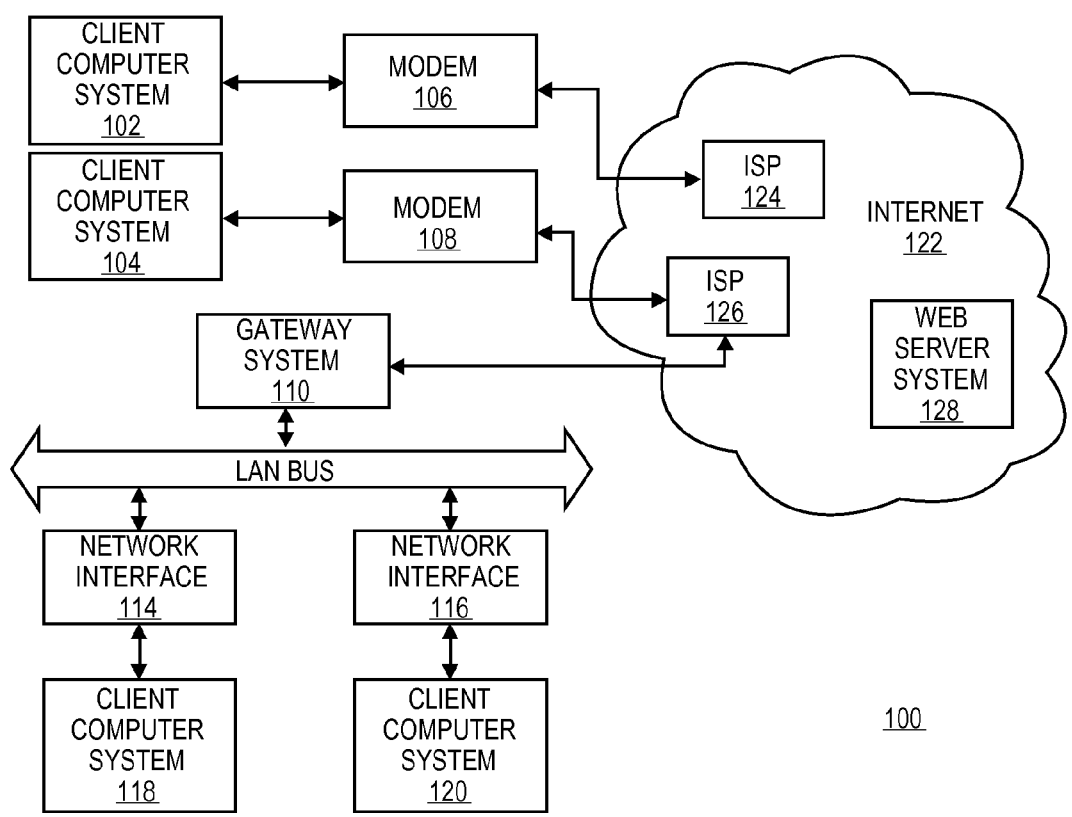
FIG. 1 is a block diagram of networks to which data processing systems are coupled and in which Web pages, such as those whose URL originated from an email message, may be accessed via a Web browser.

As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in a network within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126.

Access to the Internet may facilitate transfer of information (e.g., Web pages, email, text files, media files, etc.) between two or more digital processing systems, such as the client computer systems 102, 104, 118, and 120 and/or a Web server system 128 as well as other Web servers (not shown). For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML documents (e.g., Web pages), which may be provided by the Web server 128.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G5 or iMac computer available from Apple Computer, Inc., a "network" computer, a handheld/portable computer, a cell phone with data processing capabilities, a Web TV system, embedded devices, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Figure 2:
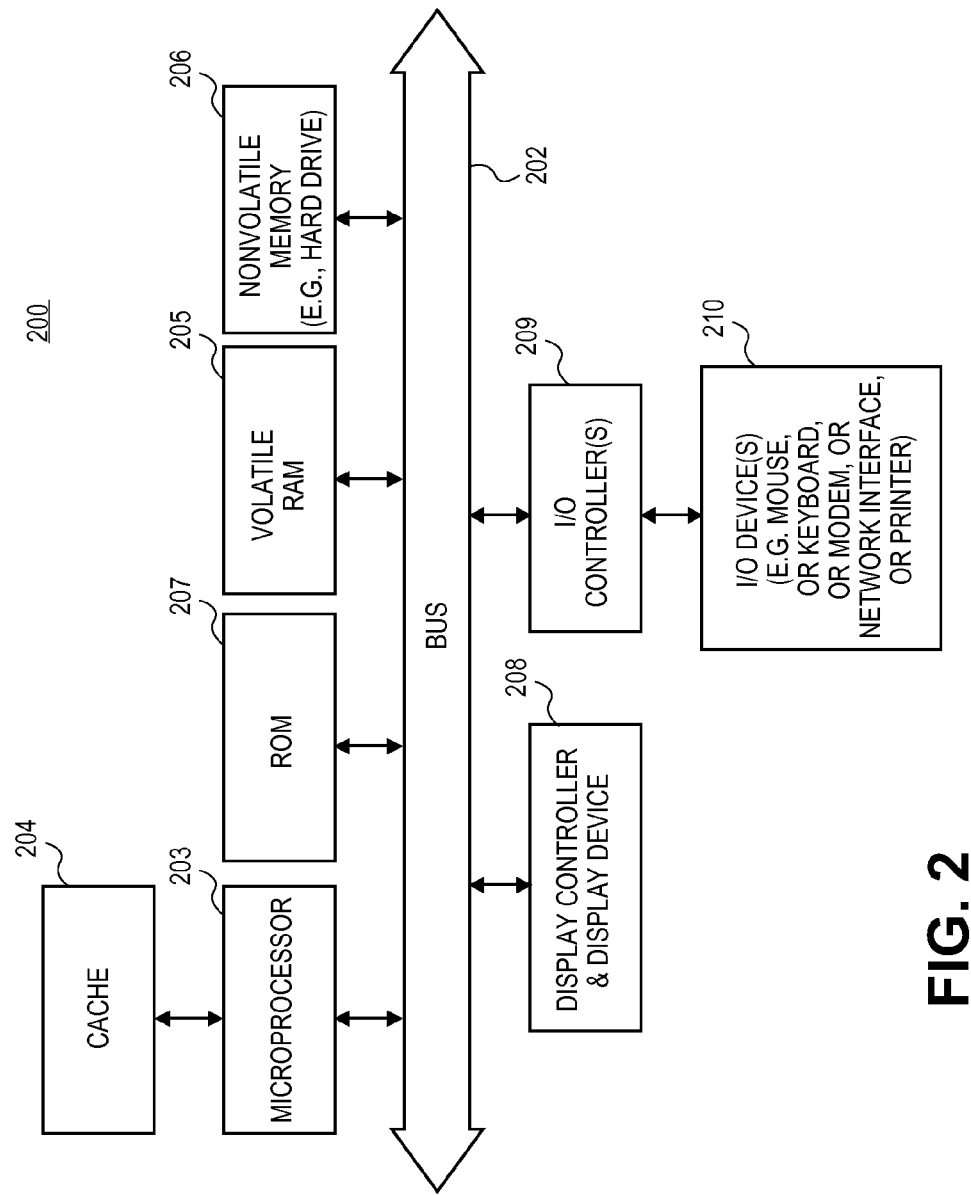
FIG. 2 is a block diagram of a digital processing system which may be used to access a Web page via a Web browser.

FIG. 2 is a block diagram of a digital processing system which may be used with one embodiment of the invention. For example, the system 200 shown in FIG. 2 may be used as a client computer system (e.g., the client computer systems 102, 104, 118, and/or 120), a Web server system (e.g., the Web server system 128), or a conventional server system, etc. Furthermore, the digital processing system 200 may be used to perform one or more functions of an Internet service provider, such as the ISP 124 and 126.

Note that while FIG. 2 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2 may, for example, be an Apple Macintosh computer.

As shown in FIG. 2, the computer system 200, which is a form of a data processing system, includes a bus 202 which is coupled to one or more microprocessors, such as a microprocessor 203 and a ROM 207, a volatile RAM 205, and a non-volatile memory 206. The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in machine-readable medium such as a memory (e.g. ROM 107, RAM 105, mass storage 106 or a remote storage device or a combination of such devices). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 3A:
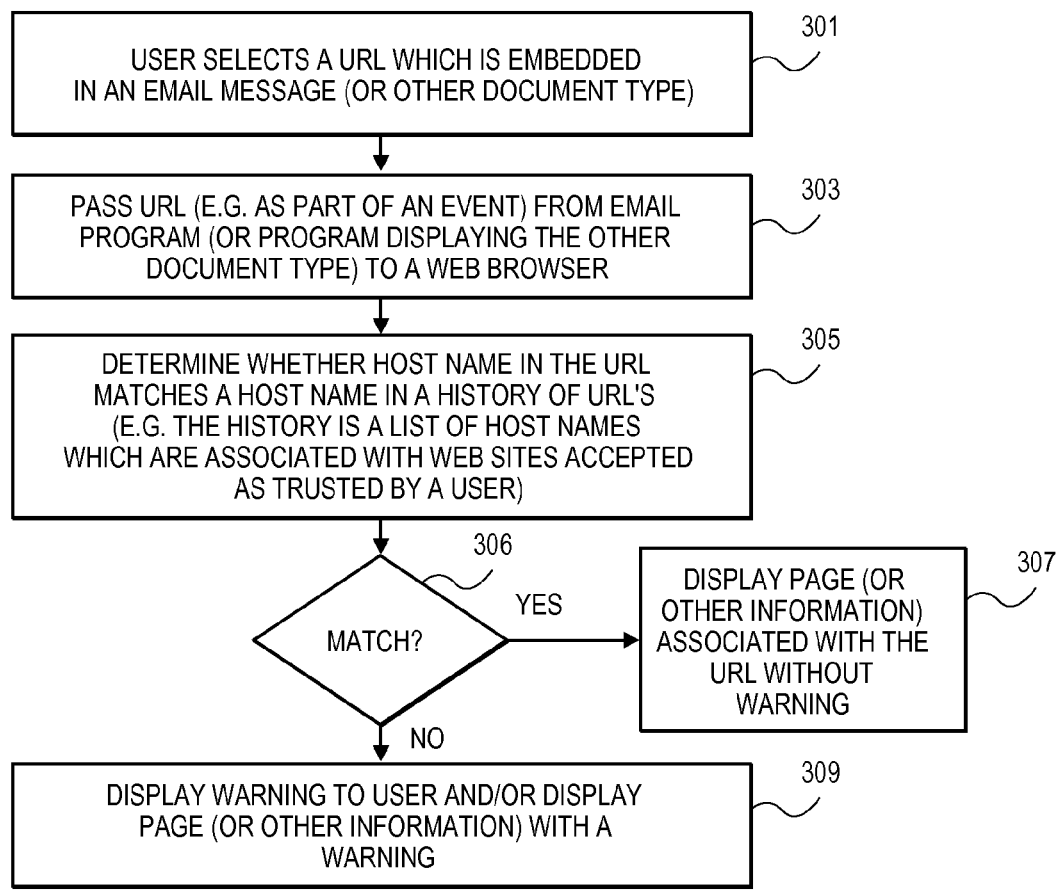
FIG. 3A is a flowchart illustrating an exemplary method to determine if a user should be warned about a possible phishing email.
Figure 4A:
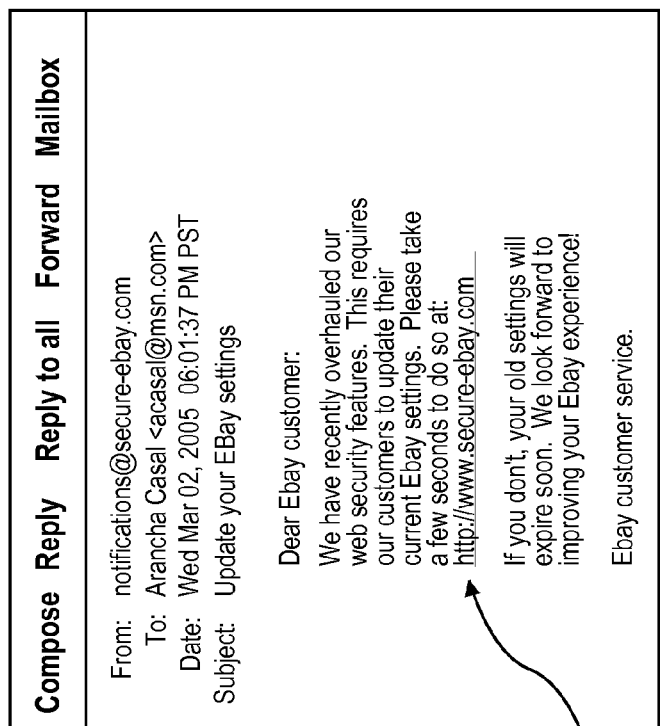
FIGS. 4 A-D shows an exemplary email message containing a phishing URL. When the user attempts to access the Web page, a warning is issued and a series of choices are presented to the user for what to do next.

An exemplary method for processing a URL, according to certain aspects of the present inventions, is shown in FIG. 3A. In this method, it is assumed that the user is being presented with a document or message which includes a URL or other locator or identifier within (or referred to by) the document or message. An example of such a message is shown as email 401 in FIG. 4A which includes the URL 403. The user may select this URL using any one of a variety of techniques known in the art, such as positioning a cursor over the URL and pressing a button, such as a button on a mouse or a keyboard. The selection of the URL by the user in operation 301 results in the passing of the URL in operation 303 from the email program (or other program displaying the URL) to a Web browser. In the context of a Macintosh operating system (e.g., Mac OS X), this may occur, for example, as an AppleEvent message. The fact that the URL is being passed from another program to the Web browser means that the URL is not automatically added to the list of trusted URLs, and consequently the Web browser will need to consult the list to determine whether this Web site is considered to be a trusted Web site. Operation 305 provides this check by determining whether, in this particular embodiment, the host name in the URL which was passed from the other program matches a host name already in a list or history of URLs. This history may be a list of host names which are associated with Web sites accepted as trusted by the user in prior Web browsing activities as described further below. If there is a match as indicated in operation 306, then the page or other information associated with the URL is displayed without any warning. If, on the other hand, there is no match, then a warning is displayed in operation 309 and the page itself or other information may also be displayed or the warning may be displayed before allowing the user to display the page or other information. In this particular embodiment, a user may be warned every time he or she attempts to access a previously unvisited Web site via a URL which is embedded in an email message or other type of document. For example, whenever a user clicks on a URL in an email, the system will determine whether there is a match between the host name in the clicked-on URL and the URLs in the history of previously trusted URLs.

The host name in the URL may be parsed from the URL using the conventions that are known in the art with respect to the portions, such as the host name portion, within a URL. One such convention is RFC 1738 which specifies, for each of the well-known Internet scheme syntaxes, which portion of the URL is the host name. For example, the "http" URL takes the form: http://host:port/path. In this case, "host" is used synonymously with "host name." Thus, in the case of the URL "http://www.apple.com/support", the host name is "www.apple.com"; in the case of the URL "http://www.wikipedia.org/", the host name is "www.wikipedia.org"; in the case of the URL "http://en.wikipedia.org", the host name is "en.wikipedia.org". In the case of the URL "http://www.apple.com:80/", the host name is "www.apple.com". The conventions defined in RFC 1738 may be found at www.ietf.org/rfc/rfc1738.txt. In alternative embodiments, the complete URL which is selected (e.g. selected within an email message) by the user may be compared against the complete URLs maintained in the list of URLs rather than just the host name portion of URLs. It will also be appreciated that other portions (e.g. a portion which includes the host name and other portions) of the URLs may be selected in parsing operations and used in comparison operations rather than just the host name. Dotted decimal addresses (e.g. 10.57.40.40/ . . . ) may be entered in their entirety within the list or a portion of those addresses may be entered into the list and used for later comparison.

Figure 3B:
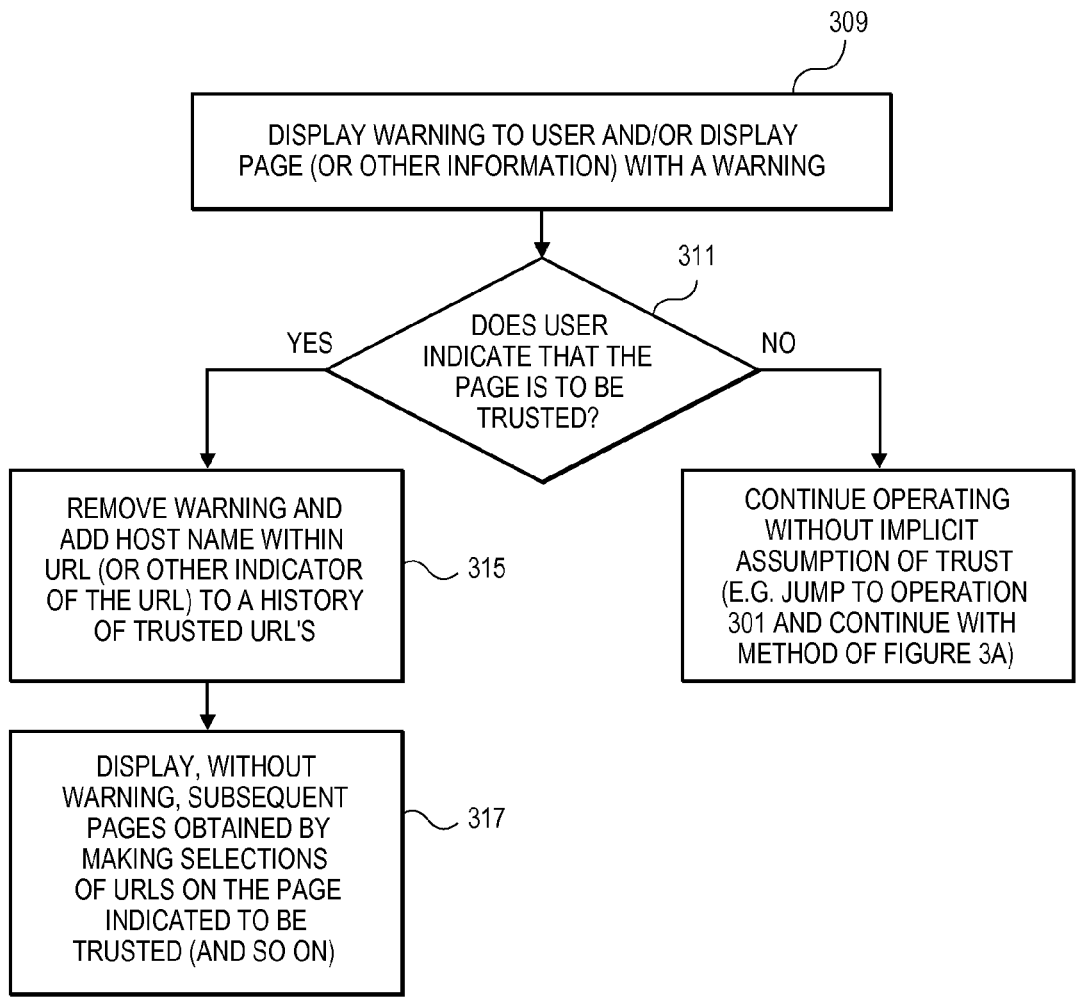
FIG. 3B is a flowchart which shows an exemplary method of processing warnings for subsequent Web pages.

The initial list in the history may be either empty when the user first buys the computer, or the list may be populated by the manufacturer of the computer or data processing system or by the producer of software for the system, such as operating system software or Web browsing software, etc. The default list may include well-known, trusted names such as www.apple.com; www.ebay.com; www.amazon.com; and www.google.com. The history list may be built up by the user and/or the system through a variety of approaches. For example, the list may be automatically populated by the system through the user's Web browsing whenever the user types, by hand, (or speaks to the computer) a URL or whenever the user selects a link on a trusted Web page. In this case, no explicit action from the user is required to populate the history list other than typing, by hand (or speaking to the computer) a URL or selecting a link on a trusted Web page. It will be appreciated that if speech recognition of spoken URLs or identifiers are used as a trusted source, then such systems which use this as a source should use one or more secure techniques to verify that the user is actually speaking (rather than a recorded audio being played by the computer's speaker) before accepting the recognized speech as a trusted source. The history list may also be added to whenever a user explicitly indicates to the system that a Web page, displayed with a warning, is to be trusted. The history list may also be automatically added to by importing a bookmarks or favorites list. FIG. 3D shows an exemplary method of automatically generating a history list of trusted addresses, such as URLs. This method may, as indicated above, be performed unobtrusively without the user's knowledge or interaction (other than, for example, typing a URL or selecting a link on an already-trusted Web page or other document specified by the URL). This method typically obtains or receives an address, such as a URL, and determines the source of the URL; this is shown in operation 351 of FIG. 3D. The source may be determined in a variety of ways which would be known to those in the art. In operation 353, the data processing system automatically adds the received URL into a history list of trusted URLs if the source of the URL is trustworthy. For example, if the source is a user's typing of the URL into a Web browser's address field or a selecting of a URL on an already-trusted URL (which is already listed in the history list of trusted URLs), then the URL is added automatically, by the system, into the history list of trusted URLs without asking the user to accept or reject (or otherwise be informed or involved in) the addition. In certain alternative embodiments, the system may optionally display an accept or reject dialog box.

Figure 4B:
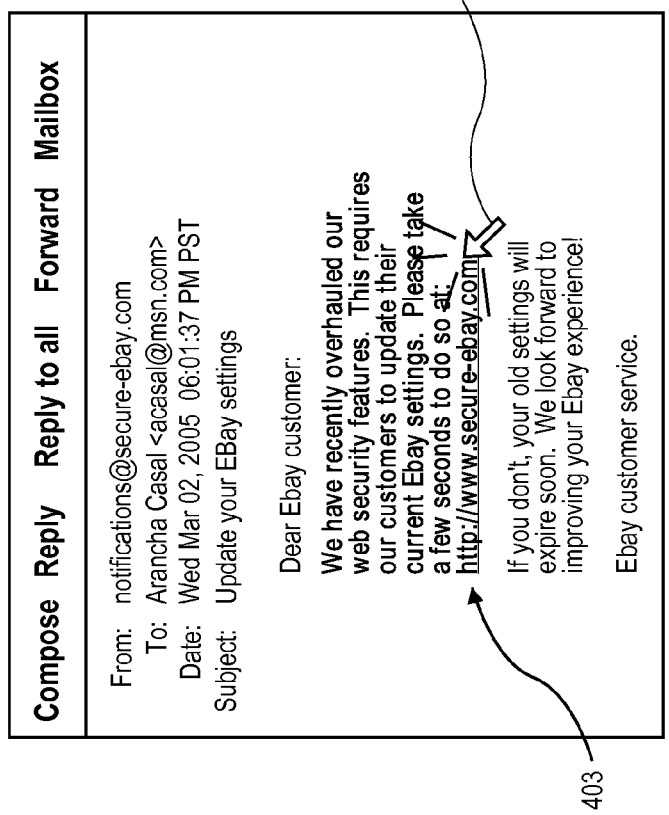
Figure 4C:
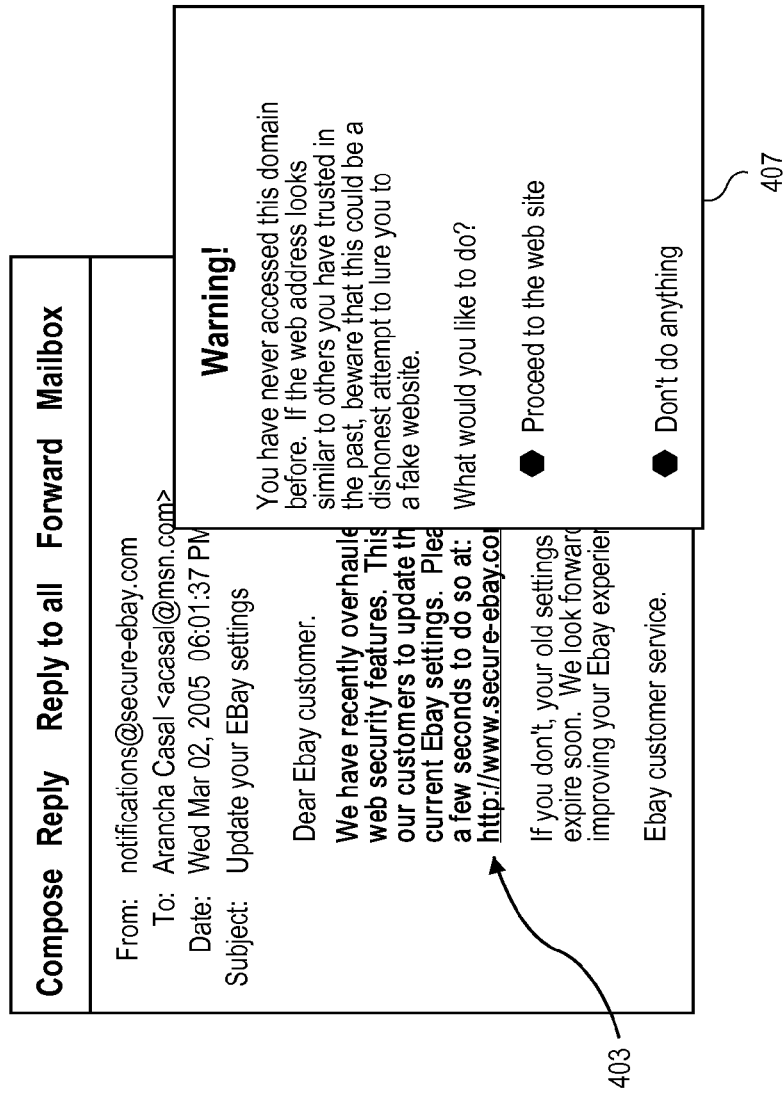

Once a warning is displayed to a user, the user may decide to ignore the warning and examine the Web page or decide that the Web site is authentic and that it can be trusted. It will be appreciated that alternative approaches may give the user a different set of options. The method shown in FIG. 3B gives the user an option of either accepting the page or browsing further while remaining in "untrusted mode." The method of FIG. 3B may begin in operation 309 which may be the same operation 309 as in FIG. 3A. Examples of warnings are shown in FIG. 4C (as warning 407) and in FIG. 5B (as warning 505). In the case of the example shown in FIG. 4C, the warning is displayed before displaying the Web browser window and the Web page within that window. In the example shown in FIG. 5B, the warning is displayed as a banner in the Web browser window. It will be appreciated that in certain embodiments, a warning may be displayed before displaying the Web browser window and a further warning or banner may be displayed within the Web browser window.

As shown in FIG. 3B, in response to the warning, the user may either, in operation 311, accept the page as to be trusted or continue browsing in "untrusted mode." If the user chooses not to accept the page as trusted then, as shown in operation 313, the warning banner or other warning continues to be displayed, and pages obtained from URLs selected from the untrusted page are not automatically added to the user's list of trusted pages. For example, a Web page which is displayed as a result of selecting a URL from the untrusted page will, if it does not already appear on the user's list of trusted pages, include a warning on that Web page and/or a warning before displaying the subsequent Web page. For example, if a phishing site includes a link to the real Google or the real eBay, that page will be displayed without a warning banner, because it is already deemed to be trusted (assuming the URLs for the real Google or the real eBay are on the list of trusted pages); however, if a phishing site includes a link to a fraudulent imitation of Google or eBay, which does not appear in the user's list of trusted pages, then that page will be displayed with a warning banner. In addition, in certain embodiments, input elements or input fields within these Web pages may be disabled and Java script and/or applets may also be disabled so as to provide an additional level of protection to the user.

Figure 5A:
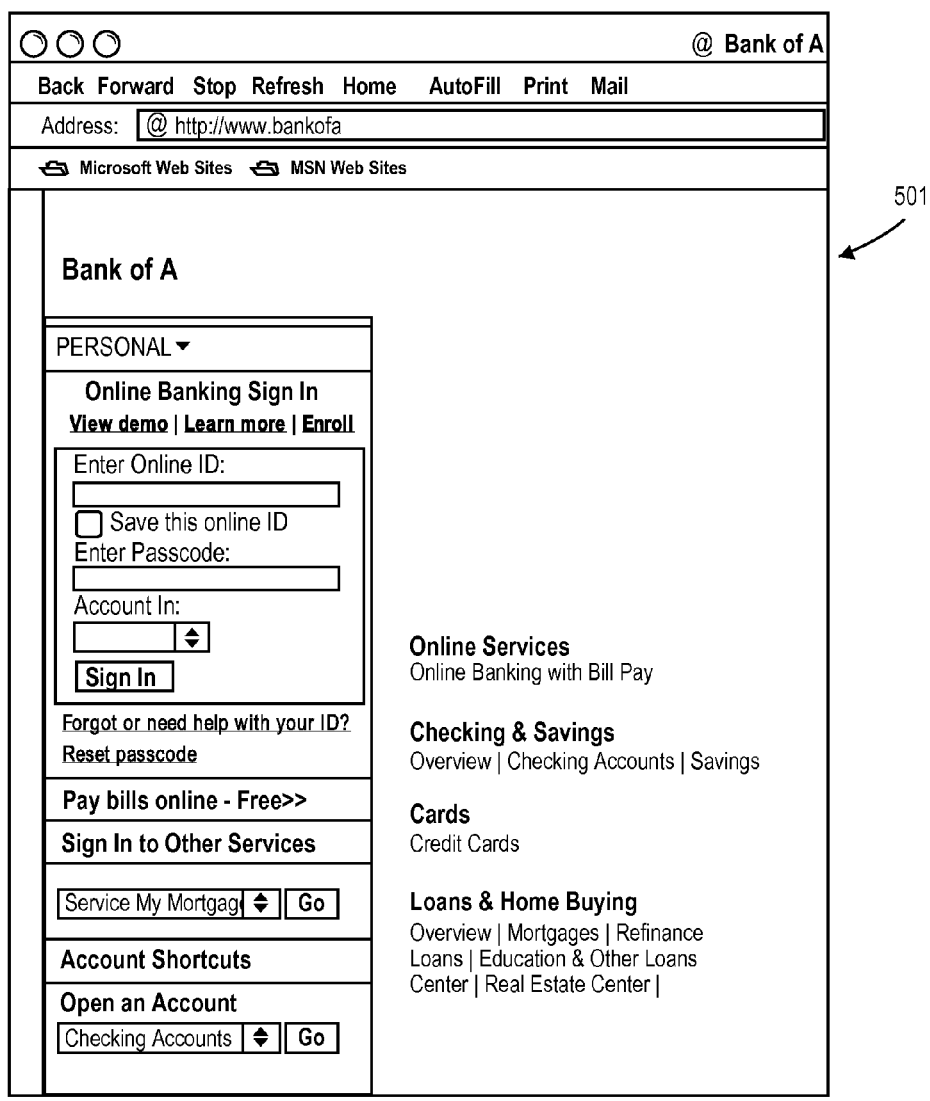
FIG. 5A is an example of a user interface of a Web browser displaying a Web page (which does not include a warning banner)

If in operation 311 the user indicates that the page is to be trusted, then operation 315 follows in which the warning is removed and the host name within the URL (or another indicator or representation of the URL) is added by the system to the history of trusted URLs (e.g. it is added automatically by the system in response to the user's indicating that the page is to be trusted). An example of removing the warning from the Web page is shown in FIG. 5A in which a Web page is displayed without a warning. In those embodiments in which the warning is displayed before displaying the Web page, the warning is removed and then the Web page is displayed, typically without any further warning. If the user selects URLs on the displayed Web page which has been indicated as to be trusted (e.g. a Web page after the warning has been removed as part of operation 315) then subsequent Web pages displayed in operation 317 are automatically added, by the system, to the history list of trusted Web pages and are displayed without any warning and this continues for such subsequent Web pages. For example, the host names are parsed from the URLs for these Web pages and added to the history of trusted URLs. An example of how this may occur is a Google search which produces a Web page without a warning, and subsequent Web pages derived from the search page, such as the selection of URLs on the original Google search result page will result in the display, without warning, of such subsequent pages. The motivation behind this logic is that any page that's been indexed by Google is probably not a phishing page. To be useful, the protection offered by various embodiments of this invention does not have to be 100% effective for 100% of users. It merely has to be sufficiently effective that the number of people who fall victim to phishing attacks is dramatically lowered, thereby making phishing attacks no longer attractive to criminals. For a Web page referenced in a phishing email to be displayed without a banner, the user would have to have already discovered that page via a Google search, and as anyone that has ever tried to get pages into the first page of Google search results knows, contriving to make that happen is a hard problem even for legitimate businesses. If phishers had a reliable way of making their pages appear in Google search results, they could attack people directly via that means, and they wouldn't need to phish via email.

A trusted page (e.g. an anti-phishing Web page) may include a link to a known phishing Web page; normally, the link on a trusted page would be considered trusted, so the trusted page in this case should include a tag or other mechanism to explicitly indicate that the link is not trusted (and thus trust from the trusted page is not inherited in this case).

Figure 5B:
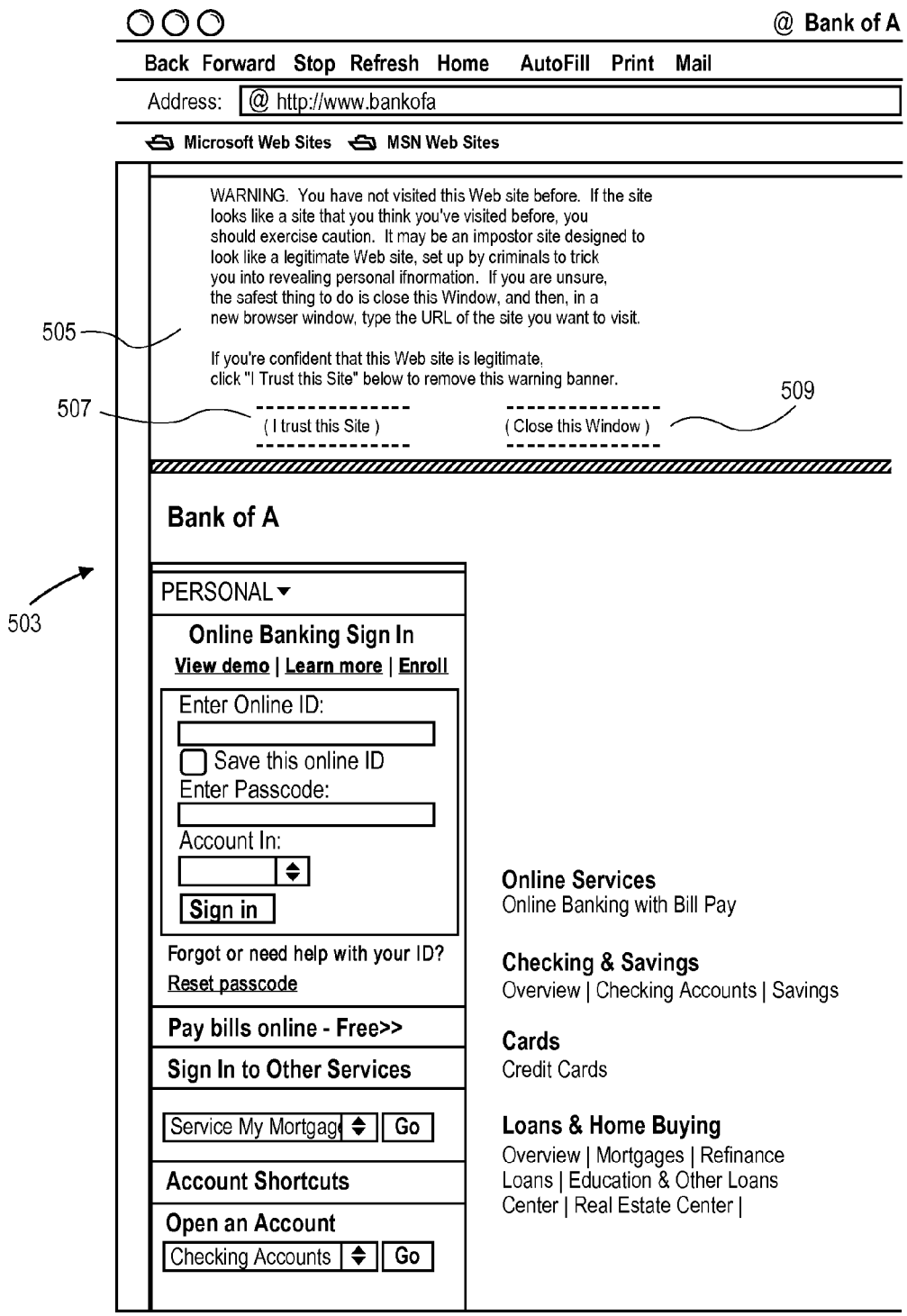
FIG. 5B is an example of a user interface of a Web browser displaying a Web page (which does include a warning banner).

It will be understood that other types or forms of warnings may be provided rather than (or in addition to) the exemplary warnings shown in FIGS. 4C and 5B. These other warnings include (a) a change in the appearance of a cursor; (b) a flag displayed next to the URL determined to be untrusted; (c) a change in the appearance of the URL, determined to be untrusted, when a user positions a cursor over the URL, etc. These other warnings may be displayed before a user even selects a URL of a Web site in, for example, an email. For example, the email program mail may search through the content of an email and find URLs in the content and compare them to a list of trusted URLs. In certain embodiments, a system may decide that, even though the URL is untrusted, a warning is not to be given because, for example, analysis of the message which includes the URL suggests that the Web site will be safe. Of course, such embodiments which do not give warnings in every instance of an untrusted URL (from an untrusted source) should be designed carefully. In general, doing this would be very unwise, because we have to assume that phishers have access to the same computer software that is sold to other customers. If there is any way to craft an email message such that the warning banner does not appear, then of course phishers will craft their email message in that way. A user, who has come to rely on the warning banners as a protection against phishing, will take the absence of such a banner as an indication of trustworthiness, and will then be rendered less safe by certain embodiments of this invention instead of more safe.

At least some of the embodiments described herein refer to the display or presentation of information from a URL (or other identifier) within a Web page, but it should be understood that the use of the term "Web page" is not meant to limit the type or format of content displayed or otherwise presented; for example, the content may include one or more content formats including, but not limited to, HTML and other types of HTML (DHTML), Flash, PDF documents (e.g. displayed through a plug-in for a Web browser), word processing documents, plain text files, movie or audio files (e.g. QuickTime movies or MP3 files), etc.

Figure 3C:
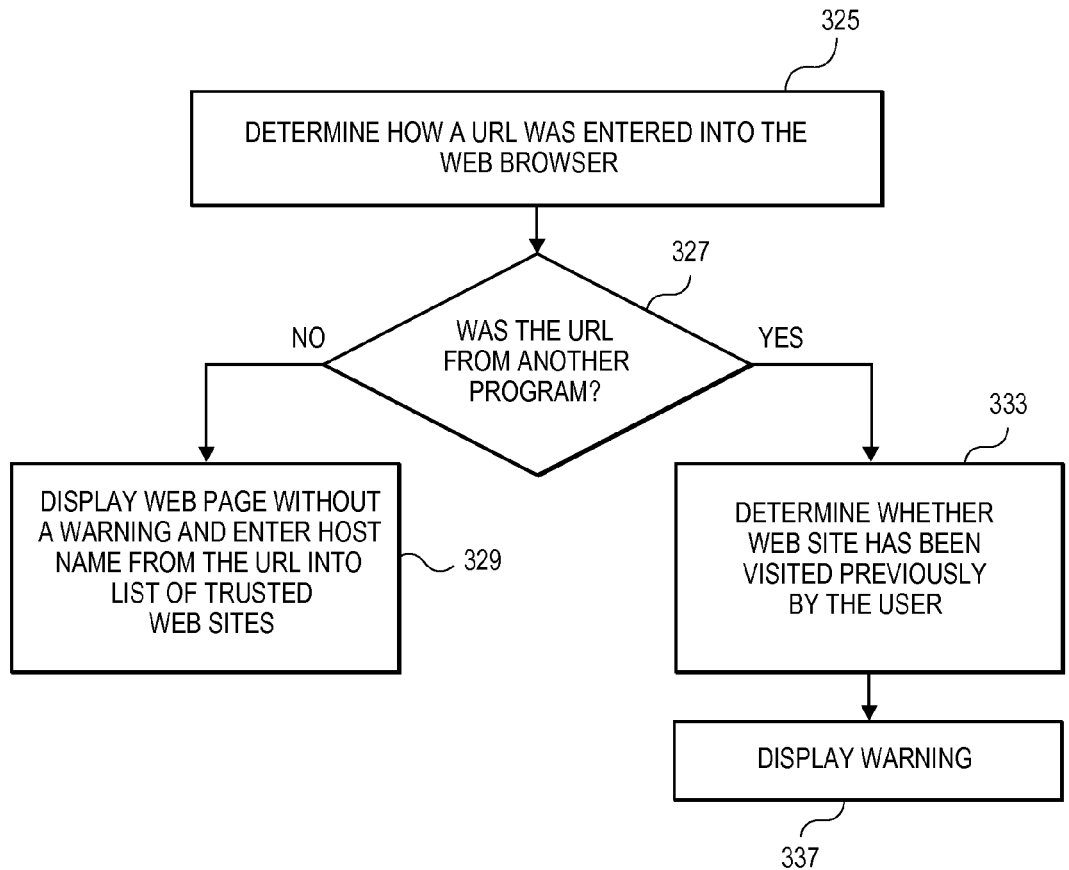
FIG. 3C is a flowchart which shows an exemplary method of determining a source of a URL.
Figure 3D:
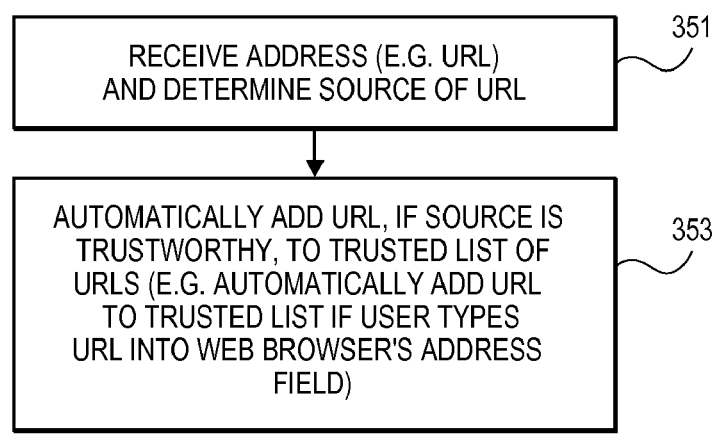
FIG. 3D is a flowchart which shows an exemplary method of generating a list of trusted URLs.

An example of another aspect of the present inventions is shown in FIG. 3C. This method processes URLs to determine the source of the URL in order to determine whether or not warnings are to be displayed to the user and whether or not the URL or other identifier (e.g. an address of information on a network) is to be added (e.g. automatically) to a list of trusted URLs. A URL may be inputted or entered into a Web browser in a number of different ways. For example, the user may type the URL into an address field on a Web browser or may paste the URL, at the end of a copy and paste or cut and paste operation, into the address field of a Web browser or the user may drag and drop the URL into the Web browser window or address field. Further, the URL may be passed through an event (e.g. an AppleEvent) or other operation automatically (e.g. without any user action other than to select the URL) from one application program, such as an email program or a PDF application program, to the Web browser which then automatically retrieves and displays the Web page or other information resulting from the input of the URL. Also, a URL may be entered into the Web browser by selecting a link on a trusted or untrusted Web page. In operation 325, the Web browser or other software determines how the URL was entered into the Web browser. In one exemplary embodiment (shown in operation 327), the Web browser at least determines whether the URL was obtained from an event (e.g. an AppleEvent) which passes the URL to the Web browser from, for example, an email program. Such a source, at least in certain embodiments, would normally be considered to be an untrustworthy source, as URLs from phishing emails are a typical source of URLs which cannot be trusted. Thus, the system in operation 327 determines whether the URL was from a source that is not considered implicitly trusted (e.g. the URL comes from another program). Operation 327 may also (optionally) determine whether the user pasted a URL into the Web browser's address field or selected a link on an untrusted Web page or dragged and dropped a URL. The pasting of a URL into the Web browser's address field and the dragging and dropping of a URL and the selecting of a link on an untrusted Web page are, at least in certain embodiments, normally considered to be untrustworthy sources. If operation 327 determines that the URL is from an untrustworthy source, then that URL is not added to the list of trusted URLs. In operation 333 it is determined whether the Web site appears on the list of trusted URLs. In the embodiments described herein, operation 333 may be performed by parsing the host name in the URL and comparing that host name to a list of host names in the list of trusted Web sites. If there is no match, indicating that the Web site is not considered trusted, then a warning is displayed in operation 337. Processing may proceed from operation 337 to operation 309 in FIG. 3B. In operation 327, if it is determined that the URL was not from another program and is otherwise trustworthy (e.g. the user typed in the URL or selected a URL from a trusted Web page), then the URL is entered automatically, by the system, into the list of trusted Web sites for the user or for the entire system, and as a result the Web page is then displayed without a warning in operation 329. Normally, determining that a URL is trustworthy (e.g. the URL was typed) means that the history list need not be examined for that URL before displaying the information which was obtained through the URL, although it may be considered desirable to examine the history list (for redundancy) before adding that URL to the history list; it will be appreciated that redundant URLs may be searched for and removed in subsequent "background" operations.

The list of trusted Web sites or other identifiers may be maintained by a data processing system on a per user basis or may be maintained for all users of the same data processing system. Further, as described below, the list may be maintained for a number of different systems on a network or group of networks which share a list accumulated through the actions of users on a number of different data processing systems or through the actions of a system administrator. The list of trusted identifiers (e.g. URLs) may be implemented in other ways, including pattern matching rules or other rules or instructions or information which cause a comparison between an identifier for information on a network and the items in the list of trusted identifiers.

Examples of specific user interfaces will now be provided. However, it will be understood that numerous alternative embodiments exist for providing warnings and other information to users as they obtain access to information on the Internet or from other sources. The embodiments shown in FIGS. 4A-4D provide a warning to the user before displaying a Web page which resulted from selecting a URL within an email. In the example shown in FIG. 4A, the URL 403 appears to look like an authentic eBay URL when in fact it is not authentic and will cause the user to be directed to a fake Web site which is made to look like an authentic eBay Web site. By positioning the cursor 405 over the URL 403 as shown in FIG. 4B, and by selecting the URL, the system responds as shown in FIG. 4C with a warning 407 which allows the user to either proceed to cause the display of the Web site (by selecting "proceed to the Web site") or to stop the selection of the URL 403 and prevent the display of the Web site resulting from that URL (by accepting "don't do anything"). The user can also select "show safe preview of Web site" to help them make the determination of whether they believe the Web site is trustworthy.

Figure 4D:
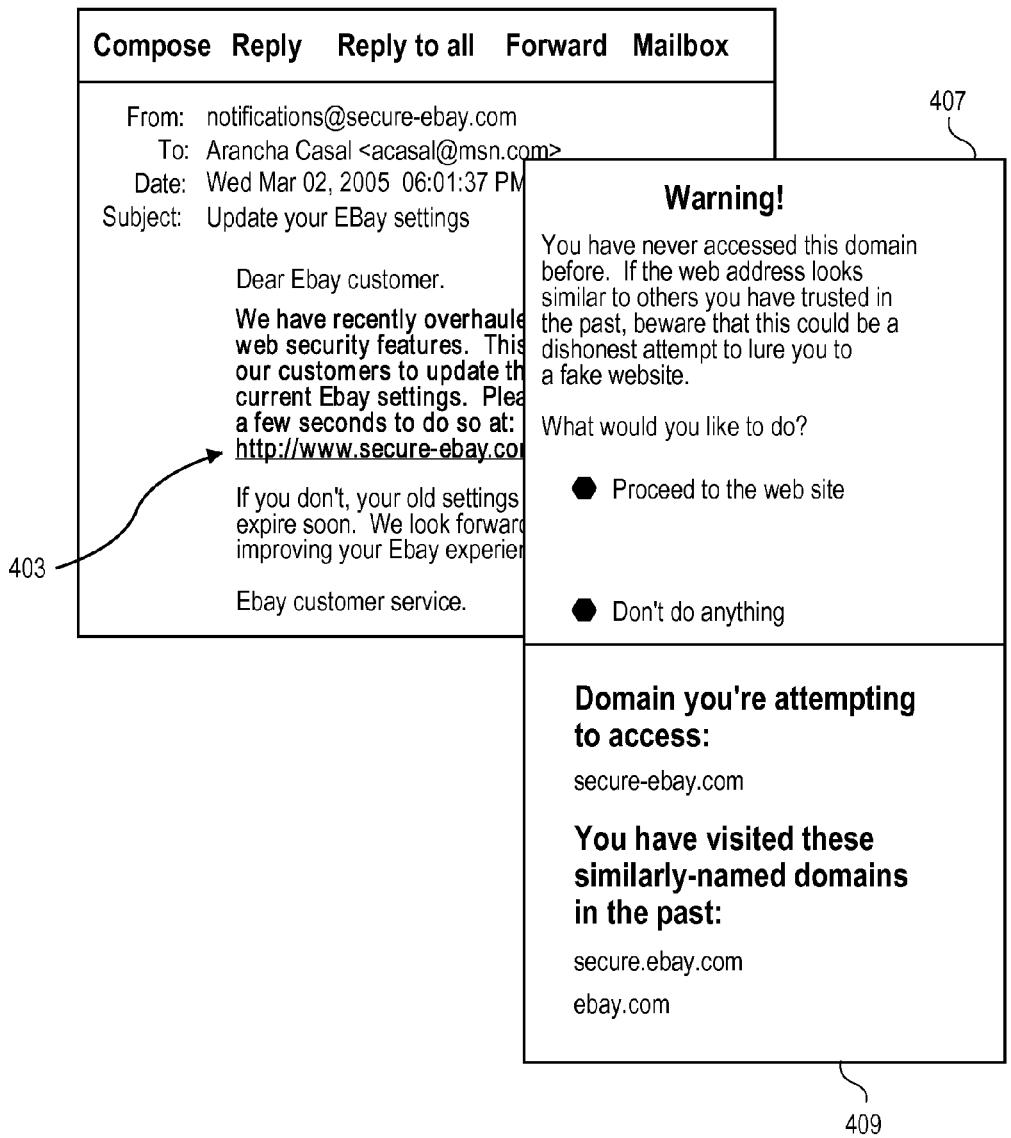

FIG. 4D shows an alternative embodiment which, in addition to the warning 407 which includes two options which are user selectable, also includes the display of a listing 409 of previously visited Web sites whose host names are similar to that of the host names included in the URL in the email message, such as URL 403. The listing 409 indicates the host name of the URL which the user has selected (in this case, "secure-ebay.com") which is displayed relative to other similarly named host names in the past. It can be seen that the fake host name includes a dash rather than a period between the words "secure" and "ebay." The use of listing 409 may provide help to the user to alert the user to the phishing attempt. The list 409 may be generated by the use of spell-checking algorithms or similar algorithms. For example, if the URL being tested, such as the URL 403 in the email message of FIG. 4D, is used as the potentially misspelled word in a spell-checking algorithm and the host names in the history or list of trusted Web sites is used as words in the dictionary, then a spell-checking algorithm may produce a result such as the listing 409 shown in FIG. 4D.

FIGS. 5A and 5B show the difference between two Web pages resulting from the display or no display of a warning. In the example of FIG. 5A, the Web page 501 is displayed in a Web browser without any warning, whereas in the example shown in FIG. 5B, the Web page is displayed with a warning 505 which includes two selection buttons 507 and 509. The warning alerts the user to the possibility that the Web site may be fraudulent and allows the user to either close the window by selecting button 509 (in which case the entire display of the Web site disappears from view, including the window) or remove the warning and to also indicate that the Web site is trusted by selecting button 507. It will be appreciated that other options with additional user interface input elements may be alternatively included.

Figure 6:
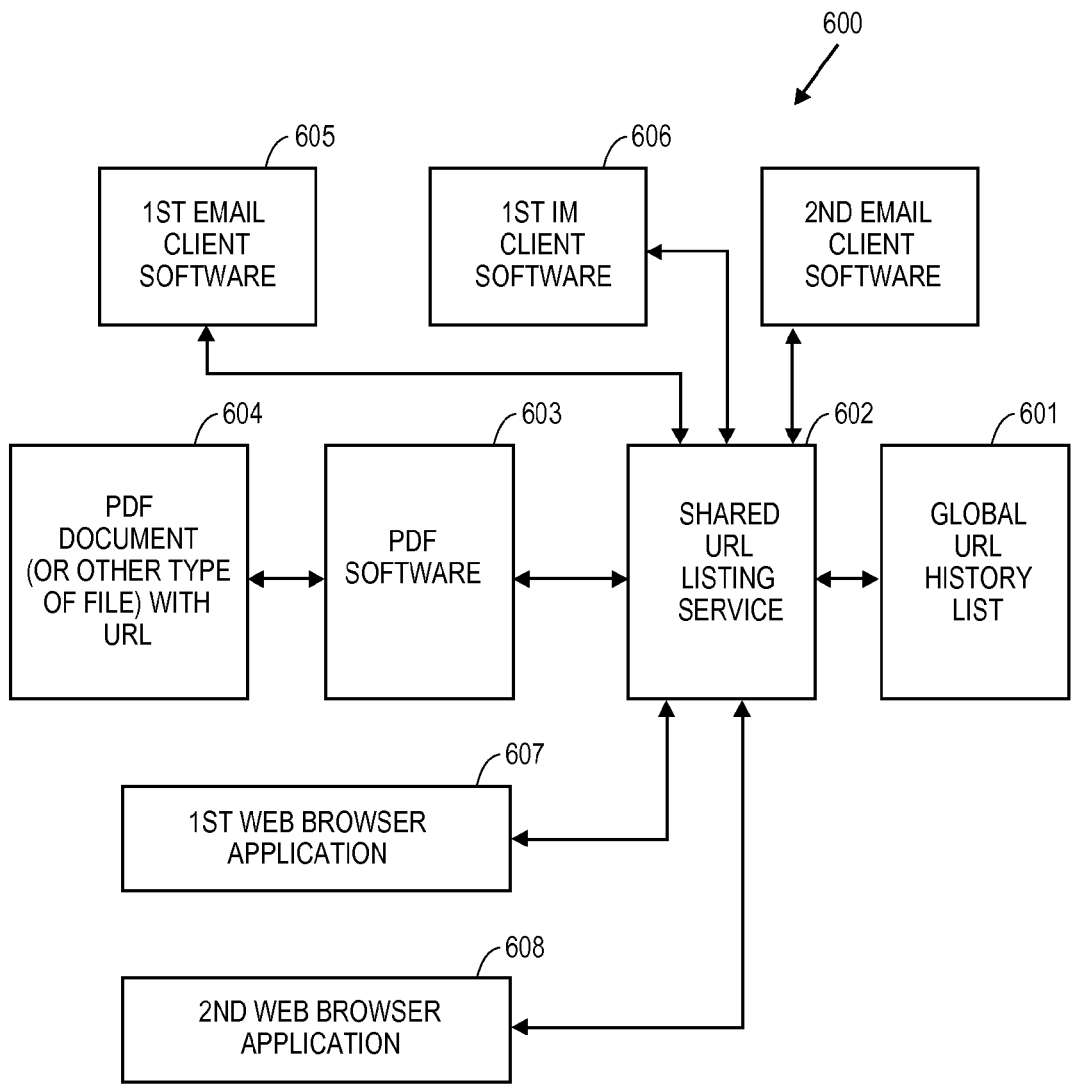
FIG. 6 illustrates an example of a manner of using a shared URL listing service which manages a global or shared URL history list on a data processing system (or for a network which includes many data processing systems).
Figure 7:
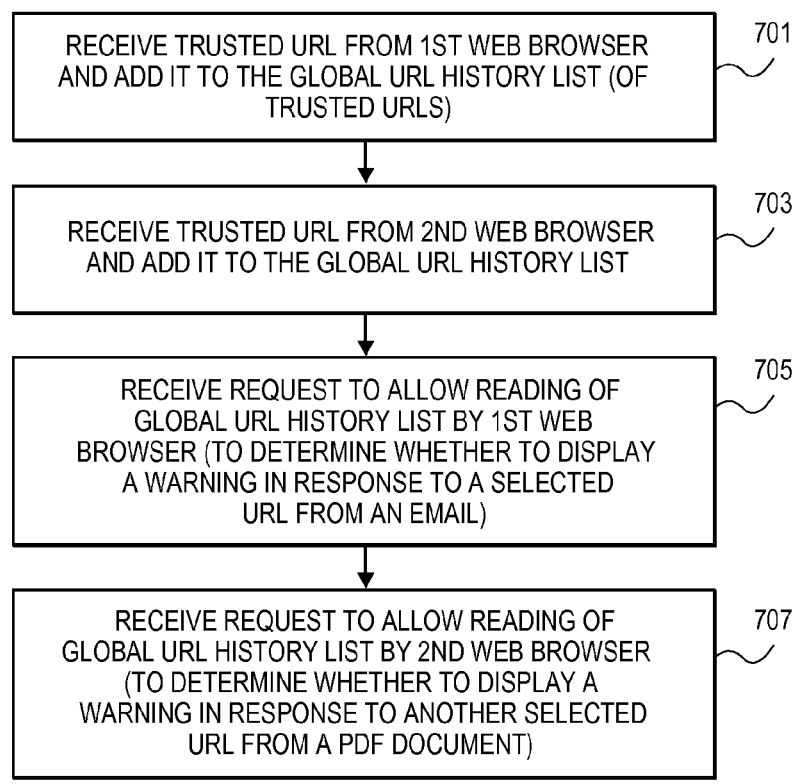
FIG. 7 illustrates an exemplary method for implementing a global or shared URL history list.

FIGS. 6 and 7 relate to another aspect of the present inventions in which multiple application programs may share a list or history of trusted Web sites, or trusted URLs. These embodiments may be implemented in a number of different ways. For example, a text file which may be accessed by different programs, such as different Web browsers 607 and 608, may be stored on a storage device and accessed by these application programs. These different application programs (e.g. Web browsers 607 and 608) write to the text file to save host names or other indicia of URLs which are regarded as trusted and retrieve or search through these URLs or host names when performing comparisons with URLs embedded within emails or other documents as described herein. Moreover, this functionality may be extended to other programs which have the capability of browsing the Web or otherwise accessing the Internet, such as email programs, instant messaging programs, and other types of programs such as PDF application programs (e.g. Acrobat from Adobe Systems). The system 600 shown in FIG. 6 includes a plurality of different programs, including two different Web browser programs, two different email programs, an instant messaging program, as well as a PDF application program. Each of these may have access to a shared URL listing service 602 which in turn acts accesses a global URL history list 601. The listing service 602 is responsible for processing requests (e.g. performing a search) from various different software programs in order to provide for reading and writing of URLs or host names for the URLs in the history list 601. The listing service may be provided by an operating system component or may be eliminated if the history list 601 is readable by the various application programs which need access to the history list (e.g. the history list is a text file which is accessible to the various application programs, such as Web browsers 607 and 608).

FIG. 7 shows a simplified method for processing URLs or portions of URLs, such as host name portions of the URLs with respect to a global URL history list, such as the history list 601 shown in FIG. 6. It will be appreciated that the history list 601 may be the same as the history list referred to in operation 305 of FIG. 3A. In the embodiment of FIG. 7, the history list is shared among a plurality of applications, such as a first and a second Web browser. Each of these Web browsers can relay data to the trusted URL list in the history list and can retrieve data in order to do searching required as a result of comparing a URL in an email or in another document with the URLs in the history list. The method of FIG. 7 gives an example of such a method. In operation 701, a trusted URL is received from a first Web browser in response to a user indicating that the URL is to be trusted. Typing a URL by hand is an example in which a user indicates that a URL is to be trusted. Following a link on a trusted page is another example in which a user indicates that a URL is to be trusted. The "yes" branch of operation 311 in FIG. 3B is an example (probably a rarer example) in which a user explicitly and consciously indicates that a URL is to be trusted. As shown in operation 701, the trusted URL, such as the host name of the URL, is added to the history list. In operation 703, another trusted URL is added to the history list in response to a user indicating, from within a second Web browser or otherwise in association with the second Web browser, that a URL is to be trusted. Then in operation 705, a request from the first Web browser is received to allow reading of the history list. This reading may be part of a search to determine whether to display a warning in response to a selected URL from an email or other document. Alternatively, this request to allow reading or searching of the URL history list may be from the originating application, such as the email application which includes the selected URL. Operation 707 includes a request to allow reading or searching of a history list by a second Web browser in order to determine whether to display a warning in response to another selected URL from, for example, a PDF document. In this case, the second Web browser is attempting to determine whether to display a warning by comparing the another selected URL from the PDF document to the URLs in the history list which may be a shared history list. It will be appreciated that the sequence of operations shown in FIG. 7 may be modified in alternative embodiments.

The global or shared history list may be implemented in a variety of different ways. For example, an operating system component or a non-operating system software component may maintain the history list by writing to the history list and by searching the history list and by performing other operations relative to the history list (e.g., importing URLs into a system-maintained history list from applications which maintain their own history list). Alternatively, each application program, such as each Web browser, may maintain its own history list of trusted Web sites. In certain embodiments, the history list may be merely a text file and each application program is responsible for writing to the text file and reading from the text file in order to do searches of the file without any assistance from a listing service. In an embodiment, each history list may be unique to each user of a data processing system or may be shared among two or more users on the same data processing system. In addition, the history list may be shared among multiple data processing systems on one or more networks. In this manner, each user on each system may contribute to the shared history list by adding trusted URLs or Web sites to the history list. This option may be user selectable such that a user may decide not to share his or her particular history list or may desire to not have the history lists of others affect that user's history list.

Figure 8:
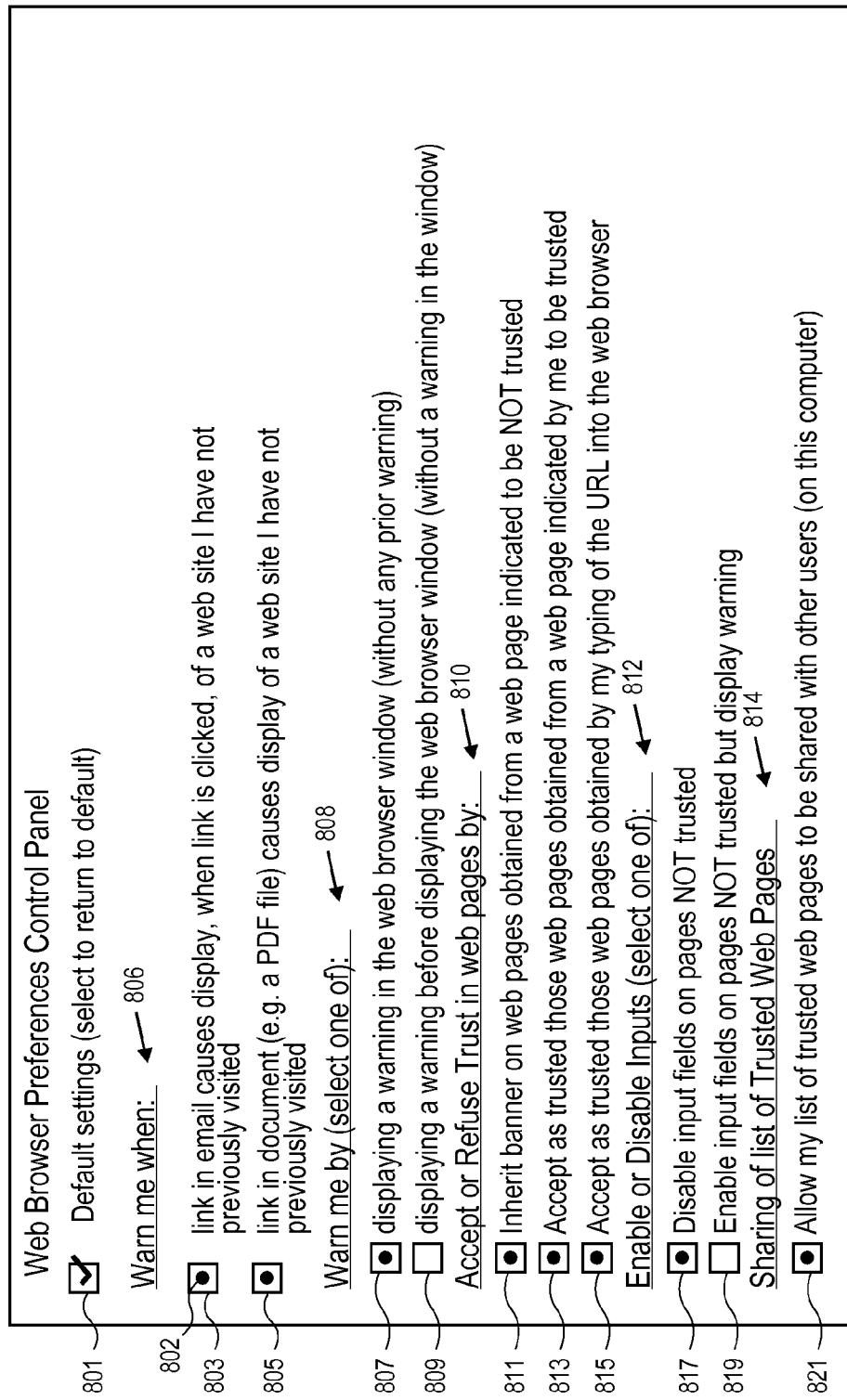
FIG. 8 illustrates an exemplary user interface for a settings or preferences panel or window for use with one or more aspects of the inventions.

While in preferred embodiments it is desirable to provide no user interface to control how a system warns or updates a list of trusted identifiers (e.g. URLs or addresses of information on a network), it may be desirable in at least certain non-preferred embodiments of the inventions to allow the user to control how the system displays warnings and how it accepts or refuses trust in Web pages, etc. FIG. 8 shows an example of a user interface which allows a user to control such parameters and functions. The panel or window 800 includes several headings 806, 808, 810, 812, and 814 under which several different parameters may be set by a user depending upon whether or not the user selects or deselects a box, such as box 803. When a dot is caused to appear within the box, it indicates to the system that the user has selected the feature or option. When no dot (or check mark) is present within the box, such as the lack of a dot within box 809, then the option is not selected by the user. The control panel includes the ability to restore the settings to a default setting by selecting box 801. The user can specify when he or she is warned by selecting or deselecting the options associated with boxes 803 and 805. For example, when box 803 is selected, a warning is displayed when an email includes a URL which will cause the display of a Web site not previously visited. The box 803 may be selected by causing the dot 802 to appear within the box 803. Box 805 has also been selected, indicating that the user will be warned when a link in a document, such as a PDF file, causes the display of a Web site which has not been previously visited. The user in the case of FIG. 8 has also selected box 807 which will cause the display of a warning in the Web browser window itself without any prior warning, rather than displaying a warning before displaying the Web browser window, which would occur if box 809 were selected by the user. Boxes 811, 813, and 815 under the heading 810 allow the user to specify how trust is accepted or refused in Web pages. All three boxes 811, 813, and 815 have been selected by the user. Thus, Web pages obtained from an untrusted Web page will not be automatically added to the list of trusted URLs. Further, because boxes 813 and 815 have been selected, trust will automatically be inherited by those Web pages obtained from a Web page indicated to be trusted and by those Web pages obtained by the user typing of the URL into the Web browser's address box or input field. Options under the heading 812 allow a user to either disable input fields (by selecting the box 817 as shown in FIG. 8) or to enable input fields by selecting box 819. The control panel shown in FIG. 8 also allows the user to specify whether or not the user's list of trusted Web pages is to be shared with other users. This may occur by selecting box 821 as shown in FIG. 8. In addition, additional options under the heading 814 may include the ability of the user to accept the use of lists by other users, such as other users on the same computer, or other users on different computers on the same or other networks.

It will be appreciated that alternative user interfaces may be implemented. For example, a simplified slider may be presented to the user and allow a user to select a position along the slider which specifies the user's preference concerning security. The slider would typically move from a most secured position to a least secured position and allow the user to make a setting at these two positions or between those positions. The user's positioning of the slider will then be used to determine the settings of a system rather than a more complex interface such as that shown in FIG. 8. Other types of controls may be employed to allow a user to select amongst a range or group of values or settings. In other embodiments, no user interface would be presented, and thus there are no options or controls or settings which are presented to the user; this is preferred, since an important value of at least certain embodiments of this invention is that they work correctly without requiring configuration or any other conscious intervention by the user.

One noteworthy aspect of the present invention is that, in a typical case, the history list of trusted pages is populated automatically without requiring explicit and burdensome decision-making by the user. By automatically populating the list with URLs the user types, and URLs the user clicks on already-trusted pages, the list automatically becomes populated with a list of trusted URLs, in such a way that a typical user should rarely see the warning banner, except when seeing an actual phishing site, and therefore a typical user should almost never have to actually click the "yes" button to explicitly add a site to the trusted list. The value in the warning banner is contingent on not getting too many false warnings. If the user gets used to the idea that an annoying banner keeps appearing, and it's always wrong, then when the banner does appear on a real phishing site, the user is likely to disregard it. Suppose, for example, the user were to get a legitimate email from Bank of America about the user's Bank of America account, then presumably the user had to have previously signed up on the Bank of America Web site for on-line banking before getting that email, so Bank of America will already be in the user's trusted list, so the user does not see a warning banner, as long as the site they are viewing is the same Bank of America site they visited before, not a phishing site impersonating it. If the user clicks a link from a Yahoo search, the link the user follows is automatically trusted because www.yahoo.com is trusted, and getting pages into Yahoo search results is known to be hard, and www.yahoo.com is trusted because the user actually typed that into the browser him or herself. In this typical case, the only time the user should see the warning banner is when the user visits a URL for a site the user has truly never seen before, where the URL was received through some external mechanism like an email message. There are two common cases here: (a) an actual phishing site, and (b) friends emailing you links to joke-of-the day sites, etc. In the latter case (i) you already know you don't expect to have seen the site before, and (ii) the site probably will not look like a banking site or similar, and if it did ask for personal or financial information you would be immediately suspicious. In an embodiment, the history list is automatically populated by URLs that a human user types by hand into the Web browser's "location" field, but not by URLs copied-and-pasted into the Web browser's "location" field, and not by URLs received in messages from another application, such as an email application, instructing the Web browser to display the page identified by a particular URL; and the history list is automatically populated using information from the target of a link that is followed from a page that is already deemed trustworthy, but not by following a link from a page that is currently deemed untrustworthy, or by opening an HTML file residing on the local disk; and the history list is explicitly populated by the user clicking an appropriate button in a warning banner or similar message, or using some other user-interface element to signify that the page should be trusted, in which case the page becomes added to the list of trusted pages, and is re-displayed without the warning banner and with the privileges and facilities accorded to a trusted page. Further, the history list may be populated by the user's importing of previously used bookmarks or favorites from, for example, previously used Web browsers or systems into a new Web browser or new data processing system. All of the URLs in the imported bookmarks or favorites list may be automatically added to the list of trusted URLs (or other identifiers).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method comprising:
obtaining a URL (Uniform Resource Locator) from an input source;
determining whether the input source includes typing by a user who is seeking to access a resource at the URL;
determining, by a data processing system in response to obtaining the URL, whether to add the URL to a list of trusted URLs, wherein if the input source includes typing by the user, the URL is added to the list of trusted URLs;
receiving an input from the user to access a Web site through the URL (Uniform Resource Locator);
verifying if the Web site is determined to be trusted, wherein verifying if the Web site is trusted comprises determining a host name of the URL and comparing the host name to a history of host names of Web sites visited and indicated to be trusted; and
presenting a warning to the user if the Web site is not trusted.

2. The method as in claim 1 wherein the host name is determined by heuristics based on the URL that is partly comprised of a host name and wherein the host name is further comprised of DNS labels.

3. The method as in claim 1 wherein the verifying if the Web site has been deemed trusted comprises examining a history list containing all sites previously visited by the user and wherein the history list is shared among a plurality of application programs.

4. The method as in claim 3 wherein each entry in the user history list is one of a host name of a site visited by the user and accepted as trusted or a full URL.

5. The method as in claim 3 wherein a listing service run by an operating system maintains and updates the history list and interacts with a plurality of application programs through which the user can access a Web site.

6. The method as in claim 3 wherein entries to the history list are made by an importer program that reports at least a portion of the URL of any Web sites visited by the user using a plurality of application programs.

7. The method as in claim wherein an electronic document, which includes the URL, is presented through a non-Web browser application program and may be one of an email message, an instant messaging message, a PDF document or any other form of electronic communication or electronic document that can include a URL in its content.

8. The method as in claim 1 wherein the presenting of the warning to the user further comprises generating and displaying a list of Web sites with similar host names that have been previously visited by the user.

9. A non-transitory machine-readable storage medium providing executable program instructions for causing, when executed, a data processing system to perform a method of managing data, the method comprising:
obtaining a URL (Uniform Resource Locator) from an input source;

determining whether the input source includes typing by a user who is seeking to access a resource at the URL;

determining, by a data processing system in response to obtaining the URL, whether to add the URL to a list of trusted URLs, wherein if the input source includes typing by the user, the URL is added to the list of trusted URLs;

receiving an input from the user to access a Web site through the URL included in an electronic document;

verifying if the Web site is determined to be trusted, wherein verifying if the Web site is trusted comprises determining a host name of the URL and comparing the host name to a history of host names of Web sites visited and indicated to be trusted; and presenting a warning to the user if the Web site is not trusted.

10. The non-transitory machine-readable storage medium as in claim 9 wherein the verifying if the Web site has been determined trusted further comprises examining a history list containing all sites previously visited by the user and wherein the history list is shared among a plurality of application programs.

11. The non-transitory machine-readable storage medium as in claim 10 wherein the electronic document is presented through a non-Web browser application program and may be one of an email message, an instant messaging message, a PDF document or any other form of electronic communication or electronic document that can include a URL in its content.

12. The non-transitory machine-readable storage medium as in claim 10 wherein each entry in the history list is one of a full URL or is a host name of a site visited by the user and accepted as trusted.

13. The non-transitory machine-readable storage medium as in claim 10 wherein a listing service run by an operating system maintains and updates the history list and interacts with a plurality of application programs through which the user can access a Web site.

14. The non-transitory machine-readable storage medium as in claim 10 wherein entries to the history list are made by an importer program that reports at least a portion of the URL of any Web sites visited by the user using a plurality of application programs.

15. The non-transitory machine-readable storage medium as in claim 9 wherein the presenting of the warning to the user further comprises generating and displaying a list of Web sites with similar host names that have been previously visited by the user.

16. An apparatus comprising:

means for obtaining a URL (Uniform Resource Locator) from an input source;

means for determining whether the input source includes typing by a user who is seeking to access a resource at the URL;

means for determining, by a data processing system in response to obtaining the URL, whether to add the URL to a list of trusted URLs, wherein if the input source includes typing by the user, the URL is added to the list of trusted URLs;

means for receiving an input from the user to access a Web site through the URL included in an electronic document;

means for verifying if the Web site is determined to be trusted, wherein verifying if the Web site is trusted comprises determining a host name of the URL and comparing the host name to a history of host names of Web sites visited and indicated to be trusted; and means for presenting a warning to the user if the Web site is not trusted.

* * * * *

UNITED STATES PATENT AND TRADEMARK OFFICE
CERTIFICATE OF CORRECTION

| | | |
|---|---|---|
| PATENT NO. | : 7,930,289 B2 | Page 1 of 1 |
| APPLICATION NO. | : 11/497399 | |
| DATED | : April 19, 2011 | |
| INVENTOR(S) | : Stuart D Cheshire | |

It is certified that error appears in the above-identified patent and that said Letters Patent is hereby corrected as shown below:

In column 16, line 52, in Claim 7, delete "claim" and insert -- claim 1 --, therefor.

Signed and Sealed this
Twenty-ninth Day of November, 2011

David J. Kappos
*Director of the United States Patent and Trademark Office*